(12) United States Patent
Lopez et al.

(10) Patent No.: US 11,756,127 B1
(45) Date of Patent: Sep. 12, 2023

(54) SYSTEMS AND METHODS FOR MANAGING FINANCIAL TRANSACTION INFORMATION

(71) Applicant: United Services Automobile Association (USAA), San Antonio, TX (US)

(72) Inventors: Jeanie Graciela Lopez, San Antonio, TX (US); Bharat Prasad, San Antonio, TX (US); Joel S Hartshorn, Olalla, WA (US); Nolan Serrao, Plano, TX (US); Paula Ann Whittington, Helotes, TX (US); Thomas Wayne Schwarz, Jr., Helotes, TX (US); Minya Liang, Redmond, WA (US); Snehal Desai, Richardson, TX (US); Celena Dortch, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 261 days.

(21) Appl. No.: 16/937,305

(22) Filed: Jul. 23, 2020

(51) Int. Cl.
*G06Q 40/08* (2012.01)
*G06Q 30/018* (2023.01)
(Continued)

(52) U.S. Cl.
CPC ......... *G06Q 40/08* (2013.01); *G06F 16/2365* (2019.01); *G06Q 10/087* (2013.01);
(Continued)

(58) Field of Classification Search
CPC ...... G06Q 40/08; G06Q 40/12; G06Q 10/087; G06Q 10/10; G06Q 30/0278; G06F 16/2365
(Continued)

(56) References Cited

U.S. PATENT DOCUMENTS

| | | | | |
|---|---|---|---|---|
| 8,209,226 B2 * | 6/2012 | Cheney | ................. | G06Q 30/06 705/26.1 |
| 8,577,689 B1 * | 11/2013 | Czarnetzky | ............ | G06Q 10/00 705/1.1 |

(Continued)

OTHER PUBLICATIONS

Demarco, Anthony, "Building relationships online: how three jewelers are using the Internet to personalize their businesses, educate consumers and attract customers from outside their regions", Jewelers Circular Keystone 175.7: 106(4), Reed Business Information, Inc. (US), Jul. 2004.*

*Primary Examiner* — Frantzy Poinvil
(74) *Attorney, Agent, or Firm* — Fletcher Yoder, P.C.

(57) ABSTRACT

A system includes at least one processor and at least one non-transitory computer-readable media communicatively coupled to the at least one processor. In an embodiment, the at least one non-transitory computer-readable media stores instructions which, when executed, cause the processor to perform operations including receiving a request to insure an item of personal property. The operations also include determining ownership of the item based on information stored on a distributed ledger. The operations also include determining authenticity of the item based on the information stored on the distributed ledger. The operations also include determining a value of the item based on the information stored on the distributed ledger. The operations also include generating an insurance policy for the item based at least in part on the value.

16 Claims, 4 Drawing Sheets

(51) Int. Cl.
*G06Q 30/02* (2023.01)
*G06F 16/23* (2019.01)
*G06Q 40/12* (2023.01)
*G06Q 10/087* (2023.01)
*G06Q 10/10* (2023.01)

(52) U.S. Cl.
CPC ......... *G06Q 10/10* (2013.01); *G06Q 30/0185* (2013.01); *G06Q 30/0278* (2013.01); *G06Q 40/12* (2013.12)

(58) Field of Classification Search
USPC ....................................................... 705/3–44
See application file for complete search history.

(56) References Cited

U.S. PATENT DOCUMENTS

| | | | |
|---|---|---|---|
| 9,633,347 B2 * | 4/2017 | Prellwitz | G06Q 30/0635 |
| 10,535,111 B2 * | 1/2020 | O'Brien | G07F 17/3225 |
| 11,288,752 B1 * | 3/2022 | Maurer | G06Q 20/102 |
| 2003/0050891 A1 * | 3/2003 | Cohen | G06Q 20/108 |
| | | | 705/42 |
| 2012/0004935 A1 * | 1/2012 | Winkler | G06Q 30/0601 |
| | | | 705/4 |
| 2014/0058833 A1 * | 2/2014 | Ouimet | G06Q 30/02 |
| | | | 705/14.49 |
| 2018/0181964 A1 * | 6/2018 | Zagarese | G06Q 20/40145 |
| 2018/0227393 A1 * | 8/2018 | Daub | H04L 67/01 |
| 2019/0340622 A1 * | 11/2019 | Azou | G06Q 30/0205 |
| 2022/0036310 A1 * | 2/2022 | Hei | G06Q 10/047 |

* cited by examiner

SYSTEMS AND METHODS FOR MANAGING FINANCIAL TRANSACTION INFORMATION

BACKGROUND

The present disclosure relates generally to managing financial transaction information and, more particular, to systems and methods for managing financial transaction information for an item of personal property using distributed ledger techniques.

Ownership and authenticity of personal property items, such as luxury purses and jewelry, can often be difficult to validate. In addition, insurance coverage for such personal property items may be unknowingly duplicated through personal property provisions in home insurance policies and individual policies for the personal property items. Accordingly, improved systems and methods for validating ownership of personal property items and managing insurance policies are desirable.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes at least one processor and at least one non-transitory computer-readable media communicatively coupled to the at least one processor. In an embodiment, the at least one non-transitory computer-readable media stores instructions which, when executed, cause the processor to perform operations including receiving a request to insure an item of personal property. The operations also include determining ownership of the item based on information stored on a distributed ledger. The operations also include determining authenticity of the item based on the information stored on the distributed ledger. The operations also include determining a value of the item based on the information stored on the distributed ledger. The operations also include generating an insurance policy for the item based at least in part on the value.

In another embodiment, a method includes receiving, via a processor, an indication of an activity related to a personal property item having a first value, the personal property item associated with an insurance policy stored on a distributed ledger. In certain embodiments, the personal property item is associated with an insurance policy stored on a distributed ledger. The method also includes determining, via the processor, an updated value of the personal property item based on the activity. The method also includes updating, via the processor, at least one of one or more terms of the insurance policy based on the updated value.

In another embodiment, a non-transitory, computer-readable medium includes instructions that, when executed, are configured to cause a processor to perform operations. The operations includes receiving an insurance claim on an insured item of personal property. The operations also include confirming ownership of the insured item of personal property based on information stored on a distributed ledger. The operations also include confirming at least a partial loss of value for the insured item of personal property based on the information stored on the distributed ledger. The operations also include transferring funds to an account of an owner of the insured item of personal property in response to confirming at least the partial loss of value.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure include distributed ledger systems, such as blockchain systems, application programming interfaces (APIs), and/or methods for operation thereof that may implement a distributed ledger infrastructure for managing financial transaction information, for example, the provision of such financial transaction information to other users, authorization of future financial transactions, and adjustment of insurance information for personal property items.

As mentioned above, ownership and authenticity of personal property items can often be difficult to validate. Validation of ownership and authenticity of personal property items can be beneficial to organizations by preventing against fraud and by assisting in producing accurate valuations for personal property items. To enable organizations to validate authenticity and ownership of personal property items, the presently disclosed embodiments detail certain systems and methods for accessing information about an item of personal property stored on a distributed ledger. For example, an owner of a personal property item, such as jewelry, an article of clothing, electronic devices, luxury goods, or any other suitable personal property item, may wish to protect against potential loss of the personal property item by requesting an insurance policy from an organization.

In one embodiment, a computing system may receive a request to insure an item of personal property. The computing system may determine ownership and authenticity of the item of personal property by accessing information stored on the distributed ledger. For example, information stored on the distributed ledger may include a purchase date for the personal property item, a receipt, a serial number, a product number, location of the personal property item, and any other information providing authentication and/or ownership information. The computing system may compare information stored on the distributed ledger with information received from the owner of the personal property item in the request for the insurance policy. For example, the computing system may compare a serial number recorded by the manufacturer of the personal property item on the distributed ledger with a serial number provided by the owner of the personal property item. By comparing and matching the respective serial numbers, the computing system may determine the personal property item is a valid item produced by the manufacturer.

Likewise, the computing system may compare a record of an initial financial transaction recorded by the manufacturer and/or a distributor of the personal property item on the distributed ledger with transaction information provided by the owner of the personal property item. For example, the computing system may compare a purchase date, a purchase amount, a purchase location, and any other suitable transaction information with the transaction information provided by the owner of the personal property item in order to validate an ownership of the personal property item. As a result of the validation of the ownership and authenticity of the personal property item, the computing system may protect against potential fraud by ensuring information associated with the personal property item provided by the owner is verified against information provided by a manufacturer of the personal property item, a distributor, a previously validated owner, or any combination thereof.

The computing system may determine a value for the personal property item and generate an insurance policy for the item of personal property based on the determined value. For example, the computing system may receive information from the distributed ledger associated with financial transactions for the personal property item and appraisals of the personal property item. For example, an appraiser may have recently assessed a value of the personal property item and stored the appraisal on the distributed ledger. The recently assessed value may be more accurate than a value from an initial transaction for the personal property item. As a result, the computing system may generate an insurance policy for the personal property item based at least in part on the recently assessed value. Additionally, the computing system may store the insurance policy on the distributed ledger.

As a result of theft or damage to the personal property item, the owner may file an insurance claim for a portion or all of the value of the personal property item. In some embodiments, the computing system may receive the insurance claim for an insured item of personal property. The computing system may confirm ownership of the personal property item via a distributed ledger and confirm a loss (e.g., destruction, stolen, etc.) of the personal property item and transfer funds to a banking account associated with the owner of the personal property item. For example, the owner may provide images, video, a police report, or any other suitable information depicting damage to the personal property item or a covered loss of the personal property item. By providing the evidence of covered loss or damage, the computer system may validate the insurance claim and protect against fraudulent claims.

Figure 1:
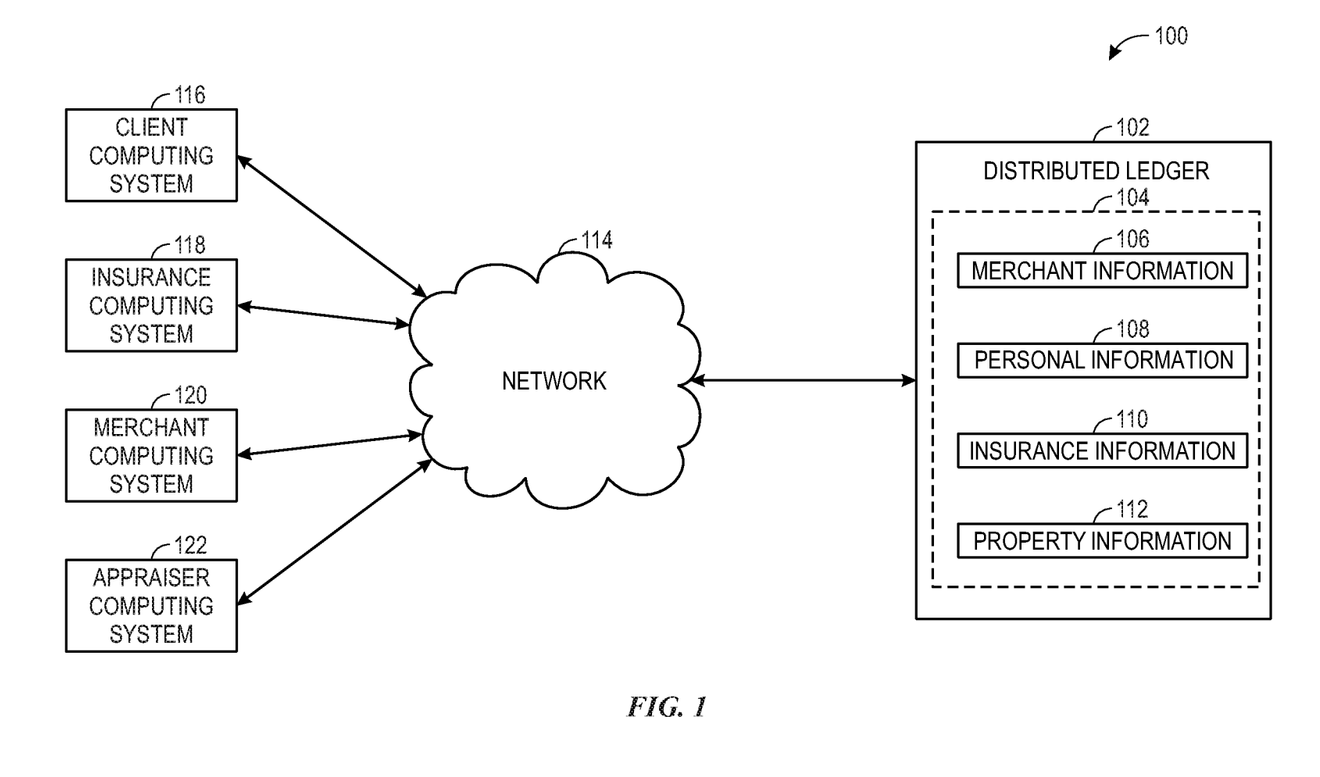
FIG. 1 illustrates a system for managing insurance policy information and authentication of personal property items, in accordance with embodiments described herein.

By way of introduction, FIG. 1 illustrates a system 100 that includes certain components and a collection of electronic devices that enable different computing systems to perform methods for managing insurance policy information and authentication of personal property items, in accordance with embodiments described herein. As shown in FIG. 1, the system 100 may include an client computing system 116, an insurer computing system 118, a merchant computing system 120, and an appraiser computing system 122 that may be communicatively coupled to a network 114. The network 114 may be any suitable computer network that enables different electronic devices (e.g., servers) communication components (e.g., routers), and the like, to facilitate the communication between the computing systems, the distributed ledger 102, and other components that may be part of the system 100.

The client computing system 116, the insurer computing system 118, the merchant computing system 120, and the appraiser computing system 122 may be any suitable computing device. In certain embodiments, the computing systems may be a mobile phone, smart phone, or a computing device (e.g., a laptop computer, a personal computer, tablet, server, and the like) that is capable of accessing information from a distributed ledger and/or managing an insurance policy. To perform one or more operations described herein, the computing systems may include various types of components that may assist in performing the operations described below. For example, computer systems may include a processor, a communication component, a display, memory/storage, an input/output (I/O) port, and the like.

The processor may be any type of computer processor or microprocessor capable of executing computer-executable code. The processor may also include multiple processors that may perform the operations described below.

The communication component may be a wireless or wired communication component that may facilitate communication between the computing systems, the distributed ledger 102, and various other computing systems via the network 114, the Internet, or the like. The display may depict visualizations associated with software or executable code being processed by the processor. In one embodiment, the display may be a touch display capable of receiving inputs from a user of the computing system. The display may be any suitable type of display, such as a liquid crystal display (LCD), plasma display, or an organic light emitting diode (OLED) display, for example. Additionally, in one embodiment, the display may be provided in conjunction with a touch-sensitive mechanism (e.g., a touch screen) that may function as part of a control interface for the computing system.

The memory and the storage may be any suitable articles of manufacture that can serve as media to store processor-executable code, data, or the like. These articles of manufacture may represent computer-readable media (e.g., any suitable form of memory or storage) that may store the processor-executable code used by the processor to perform the presently disclosed techniques. As used herein, applications may include any suitable computer software or program that may be installed onto the computer systems and executed by the processor. The memory and the storage may represent non-transitory computer-readable media (e.g., any suitable form of memory or storage) that may store the processor-executable code used by the processor to perform various techniques described herein. It should be noted that non-transitory merely indicates that the media is tangible and not a signal. The I/O ports may be interfaces that may couple to other peripheral components such as input devices (e.g., keyboard, mouse), sensors, input/output (I/O) modules, and the like. It should be noted that the components described above with regard to the computing systems are exemplary components and the computing systems may include additional or fewer components than described herein.

In some embodiments, the computing systems may use a computing application, which may be stored in the memory and executed by the processor to perform the embodiments described herein. For example, the memory may include random access memory (RAM), read-only memory (ROM), rewritable non-volatile memory such as flash memory, hard drives, optical discs, and/or the like. The memory may represent non-transitory computer-readable media (e.g., any suitable form of memory) that may store the processor-executable code used by the processor to perform various techniques described herein. It should be noted that non-transitory merely indicates that the media is tangible and not a signal. Additionally, the processor may include one or more general purpose microprocessors, one or more application specific processors (ASICs), and/or one or more field programmable logic arrays (FPGAs) The computer application may access the computing resources of the computing systems to perform its operations or interact with the computing resources of another connected computing system (e.g., cloud-computing system). In any case, for the purposes of discussion, the presently disclosed techniques will be described as being performed by insurer computing system 118. As such, it should be understood that the presently disclosed techniques are not limited to being performed by the insurer computing system 118.

As shown in the example of FIG. 1, the system 100 may include a distributed ledger 102 that may include one or more blockchains 104. The distributed ledger 102 may be hosted on any suitable number of computing devices that operate as nodes for the distributed ledger 102. Such nodes may be geographically distributed in any suitable number of locations.

The distributed ledger 102 may store any appropriate number of data records of various types relating to financial transaction information of personal property items, including data relating to merchant information 106, personal information 108, insurance information 110, and property information 112, among other types of data. As described in greater detail herein, in certain embodiments, the data relating to merchant information 106 may include identification information for a merchant that sold a personal property item, initial transaction information for the personal property item (e.g., cost of initial transaction, date of initial transaction, location of initial transaction, and other suitable transaction information), and warranty information (e.g., coverage amount for the warranty, terms of the warranty, expiration date(s), and other suitable warranty information) for the personal property item, among other data. In addition, in certain embodiments, the data relating to personal information 108 may include owner identification, and a public key of the owner, among other data. The public key of the owner may be publically visible to all users of the distributed ledger 102. The public key may be used to verify a digital signature for a corresponding private key. In addition, in certain embodiments, the data relating to insurance information 110 may include insurance policy information, insurance premium, and coverage history, among other data. In addition, in certain embodiments, the data relating to property information 112 may include a policy history of the property, a coverage status of the property, and an insurance premium for the property, among other data.

With the foregoing in mind, the insurer computing system 118 may receive a request to insure a personal property item from the client computing system 116. For example, an owner of the personal property item may submit the request from the client computing system 116. In some embodiments, the request may include owner-provided personal information and/or property information. For example, the owner-provided information may include a serial number, an initial financial transaction associated with purchasing the personal property item, a manufacture date of the personal property item, a manufacture location of the personal property item, owner identification, a property type of the personal property item (e.g., jewelry, purse, furniture, article of clothing, electronic device), and the like.

In certain embodiments, the insurer computing system 118 may access information stored in the distributed ledger 102 in response to receiving the request. For example, the insurer computing system 118 may determine and/or verify an ownership of the personal property item based on the information stored on the distributed ledger 102. In certain embodiments, the insurer computing system 118 may access the distributed ledger 102 to determine a serial number of the personal property item, an initial financial transaction of the personal property item, a financial transaction history of the personal property item, a location history of the personal property item, a registered owner of the personal property item, and any other suitable ownership information. The obtained information from the distributed ledger 102 may assist the insurer computing system 118 to determine and/or verify ownership of the personal property item. For example, the insurer computing system 118 may compare an owner associated with the serial number in the distributed ledger 102 to the owner associated with the request. In certain embodiments, the insurer computing system 118 may determine the current owner by accessing the most recent financial transaction in the financial transaction history for the personal property item.

In some embodiments, the insurer computing system 118 may determine and/or verify an authenticity of the personal property item by accessing information on the distributed ledger 102. In certain embodiments, the insurer computing system 118 may retrieve the serial number, the initial financial transaction, the financial transaction history of the personal property item, and any other suitable authentication information to determine and/or verify authenticity of the personal property item. For example, the insurer computing system 118 may compare the serial number for the personal property item provided by the owner with the request to the serial number stored in the distributed ledger 102 related to the merchant information associated with the personal property item. As a result of comparing and matching the respective serial numbers, the insurer computing system 118 may determine the personal property item is an authentic item produced by the manufacturer. In certain embodiments, the insurer computing system 118 may determine the authenticity of the personal property item by accessing the initial financial transaction for the personal property item on the distributed ledger.

After the insurer computing system 118 determines ownership and authenticity of a personal property item, the insurer computing system 118 may determine a value of the personal property item. In some embodiments, the insurer computing system 118 may analyze the financial transaction history, an appraisal, or both of the personal property item stored in the distributed ledger. For example, the insurer computing system 118 may analyze the most recent appraisal of the personal property item, the most recent financial transaction for the personal property item, or both to assess a value of the personal property item.

After determining a value of the personal property item, the insurer computing system 118 may create an insurance policy for the personal property item. In certain embodiments, prior to creating the insurance policy, the insurer computing system 118 may access insurance information stored on the distributed ledger to determine prior insurance coverage for the personal property item. For example, the personal property item may be listed as being covered by a homeowner's insurance policy. The insurer computing system 118 may analyze the homeowner's insurance policy and determine an amount of personal property coverage. In some embodiments, the insurer computing system 118 may determine whether a value of the personal property item exceeds the amount of personal property coverage under the homeowner's insurance policy. If the value of the personal property item meets or is less than the coverage under the homeowner's insurance policy, the insurer computing system 118 may cancel the request to insure the personal property item. In certain embodiments, the insurer computing system 118 may send a notification to the client computing system 116 indicating the cancellation of the request. For example, receiving the notification at the client computing system 116 may cause the client computing system 116 to open an application to display the notification. If the value of the personal property item exceeds the personal property coverage under the homeowner's insurance policy, the insurer computing system 118 may create an insurance policy for the personal property item. For example, the insurer computing system 118 may determine a coverage amount, a premium, and the like. In certain embodiments, the insurer computing system 118 may create the insurance policy based on the value of the personal property item, the financial transaction history, the warranty, the property type, the location information, and any other information stored on the distributed ledger 102. After creating the insurance policy for the personal property item, the insurer computing system 118 may store the information on the distributed ledger 102.

Although the embodiments described herein are detailed as being performed by the insurer computing system 118, it should be noted that the presently disclosed techniques may be performed using any suitable computing devices in conjunction with a cloud-based computing system, a server, or the like. For example, the insurer computing system 118 may receive a request to insure a personal property item, and the insurer computing system 118 may perform some analysis or operations described herein with the additional computing resources provided by a server, a cloud-computing system, or the like.

Figure 2:
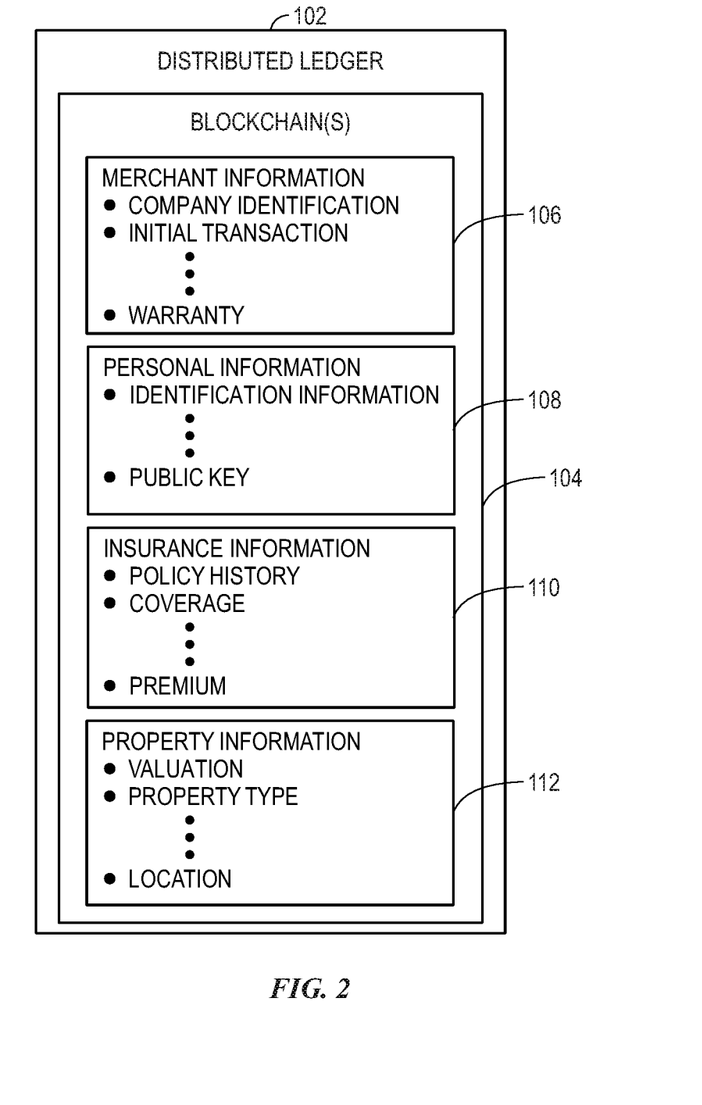
FIG. 2 illustrates certain types of data that may be stored in a distributed ledger (e.g., blockchain network) of FIG. 1, in accordance with embodiments described herein.

FIG. 2 illustrates certain types of data that may be stored in the distributed ledger 102 (e.g., blockchain 104) of FIG. 1, in accordance with embodiments described herein. As described herein, the data stored in the distributed ledger 102 (e.g., blockchain 104) may include data relating to merchant information 106, personal information 108, insurance information 110, and property information 112, among other types of data. As illustrated in FIG. 2, in certain embodiments, the data relating to merchant information 106 may include company identification information, an initial financial transaction for the personal property item, warranty information, and the like. For example, the initial financial transaction may include a price paid for the personal property item, purchaser information, a purchase location, a purchase date, and the like.

In addition, in certain embodiments, the data relating to personal information 108 may include owner identification information and a public key, among other data. For example, the owner identification information may include a full legal name, list of residential addresses including a current residential address, telephone number(s), email address(es), and so forth. In addition, in certain embodiments, the data relating to insurance information 110 may include insurance policy history, a coverage amount, and a premium amount, among other data. For example, the insurance policy history may include personal property coverage for a homeowner's insurance policy, previous personal property insurance policies, and the like. In addition, in certain embodiments, the data relating to property information 112 may include a valuation of the personal property item, a property type, location history for the personal property item, among other data. For example, the valuation may include a set of appraisals for the personal property item. In some embodiments, an appraisal may include a date of the appraisal, an appraiser identification, a description of the personal property item, and the like. In certain embodiments, the personal property item may include a geolocation device (e.g., radio-frequency identification (RFID), global positioning system (GPS)) which provides a location history for the personal property item. For example, an RFID may periodically transmit a signal including a location of the personal property item to a computing device. The computing device, such as client computing system 116, may store the location history on the distributed ledger 102. The location history may be used to validate ownership of the personal property item. For example, the insurer computing system 118 may determine a recent signal (e.g., location) received from the geolocation device corresponds to address information for the owner of the personal property item stored in the distributed ledger 102.

Figure 3:
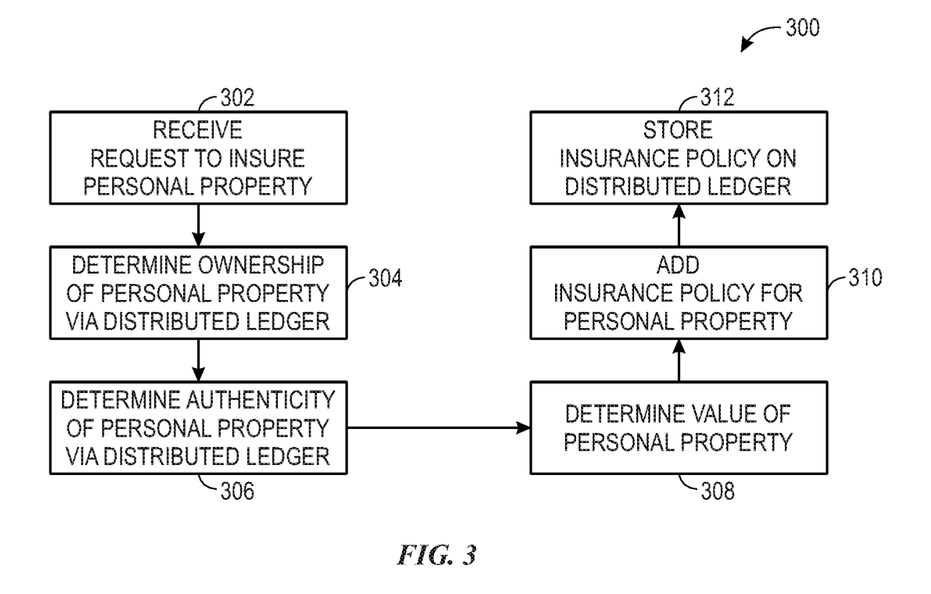
FIG. 3 illustrates a method for adding an insurance policy to an item of personal property using the distributed ledger (e.g., blockchain network), in accordance with embodiments described herein.

Owners of personal property items may desire insurance policies to cover valuable items of personal property from theft, damage, or other loss. However, validating the authenticity and ownership of such valuable personal property items may be difficult due to forgeries and fraudulent goods produced in the marketplace as well as resales of the personal property item between consumers. A computing system may use information stored on the distributed ledger to verify the authenticity and ownership of a personal property item and protect against fraud and forgeries before generating an insurance policy. FIG. 3 illustrates a method 300 for adding an insurance policy to an item of personal property using the distributed ledger 102 described herein. It should be noted that although method 300 is described below in a particular order, it should be understood that the method 300 may be performed in any suitable order. Additionally, although method 300 is described as being performed by insurer computing system 118, any suitable computing device may perform the method 300.

As illustrated in FIG. 3, in certain embodiments, the method 300 may include receiving a request at the insurer computing system 118 to insure a personal property item (block 302). In certain embodiments, the insurer computing system 118 may receive the request from the client computing system 116. For example, a user of the client computing system may send a request to insure the personal property item over the network 114, the internet, or the like. In some embodiments, receiving the request at the insurer computing system 118 may cause an application to open on the insurer computing system 118. For example, an owner of the personal property item may input property information and owner information into the client computing system 116 as part of the request.

In addition, in certain embodiments, the method 300 may include determining ownership of the personal property item at the insurer computing system 118 via information stored in the distributed blockchain network (e.g., the distributed ledger 102) (block 304). For example, insurer computing system 118 may analyze a serial number of the personal property item, a financial transaction history of the personal property item, and an initial transaction of the personal property item, among other data stored in the distributed ledger. In certain embodiments, the insurer computing system 118 may compare initial transaction information stored in the distributed ledger 102 from a manufacturer of the personal property item to transaction information provided in the request from the client computing system 116. For example, the insurer computing system may compare the respective transaction amounts, the respective transaction locations, the respective transaction dates, the respective method of payments for the transactions, and any other suitable transaction information. The insurer computing system 118 may determine whether the respective transaction information matches and, as a result, whether the personal property item is validly owned by the user of the client computing system 116. In certain embodiments, the insurer computing system 118 may analyze a transaction history to determine ownership of the personal property item. For example, a series of financial transactions associated with the personal property item may be stored on the virtual ledger 102. The insurer computing system 118 may trace the ownership of the personal property item from the manufacturer to a current owner. For example, the insurer computing system 118 may determine an initial owner of the personal property item based on initial transaction information stored in the distributed ledger 102. The initial transaction information may include an identification of the manufacturer of the personal property item and an identification of an initial purchaser of the personal property item. The insurer computing system 118 may determine a subsequent purchase of the personal property item occurred and financial transaction information associated with the subsequent purchase is stored on the distributed ledger 102. For example, the financial transaction information may include the initial purchaser as the seller of the personal property item and identification information for a subsequent purchaser of the personal property item. The insurer computing system 118 may continue analyzing a transaction history of the personal property item until reaching a final chronological transaction associated with the personal property item. The insurer computing system 118 may compare the final purchaser identification information with owner identification information provided by the user of the client computing system 116. By comparing and matching the respective identification information, the insurer computing system 118 may validate an ownership of the personal property item. For example, the respective identification information may include a name, a physical address, an email address, a public key, a social security number, and any other suitable identification information.

In addition, in certain embodiments, the method 300 may include determining authenticity of the personal property item via information stored in the distributed ledger 102 (block 306). In certain embodiments, the insurer computing system 118 may compare a serial number of the personal property item stored in the distributed ledger 102 from a manufacturer of the personal property item to a serial number provided in the request from the client computing system 116. The insurer computing system 118 may determine whether the respective serial numbers match and, as a result, whether the personal property item is an authentic item produced by the manufacturer. The insurer computing system 118 may also compare additional information stored in the distributed ledger 102 with information provided in the request from the client computing system, such as a property type, a property model name, a manufacturing date, a purchase date, or any other suitable property information.

In addition, in certain embodiments, the method 300 may include the insurer computing system 118 determining a value of the personal property item (block 308). For example, the insurer computing system 118 may analyze a recent appraisal of the personal property item, a recent financial transaction, and the like stored on the distributed ledger. After performing an appraisal, a user of the appraiser computing system 122 may store a set of property information 112 on the distributed ledger 102 associated with the personal property item and the appraisal. For example, the property information may include a manufacturer of the personal property item, a serial number of the personal property item, a model name of the personal property item, a determined value of the personal property item, an identification information for the appraiser of the personal property item, a date of appraisal for the personal property item, an identification information for an owner of the personal property item, and any other suitable appraisal information. In certain embodiments, the insurer computing system 118 may analyze a transaction history including a number of financial transactions (e.g., sales, purchases, appraisals) for the personal property item stored in the distributed ledger 102 to determine a value for the personal property item. In certain embodiments, the insurer computing system 118 may determine a value for the personal property item based on a set of values from a set of the financial transactions. For example, the insurer computing system 118 may compute an average from values of the most recent financial transactions (e.g., two financial transactions, four financial transaction, five financial transactions, and so on). In some embodiments, the insurer computing system 118 may determine the value based on a value from the most recent financial transaction stored on the distributed ledger 102. In certain embodiments, the insurer computing system 118 may determine a value of the personal property item from all financial transactions stored on the distributed ledger 102 and occurring within a specific time duration. For example, the insurer computing system 118 may determine a value based on values from financial transactions occurring within the last year or less (e.g., the last six months, the last three months).

In addition, in certain embodiments, the method 300 may include the insurer computing system 118 adding/creating an insurance policy for the personal property item (block 310). For example, the insurer computing system 118 may create an insurance policy including a coverage amount, a premium amount, and the like, based on property information of the personal property item. The insurer computing system 118 may determine a coverage amount for the insurance policy based on the determined value of the personal property item from block 308. For example, the coverage amount may be equal to the determined value of the personal property item.

In addition, in certain embodiments, the method 300 may include the insurer computing system 118 storing the insurance policy on the distributed ledger 102. The insurer computing system 118 may periodically check and/or update the stored insurance policy based on additional financial transaction information and/or property information associated with the personal property item.

Figure 4:
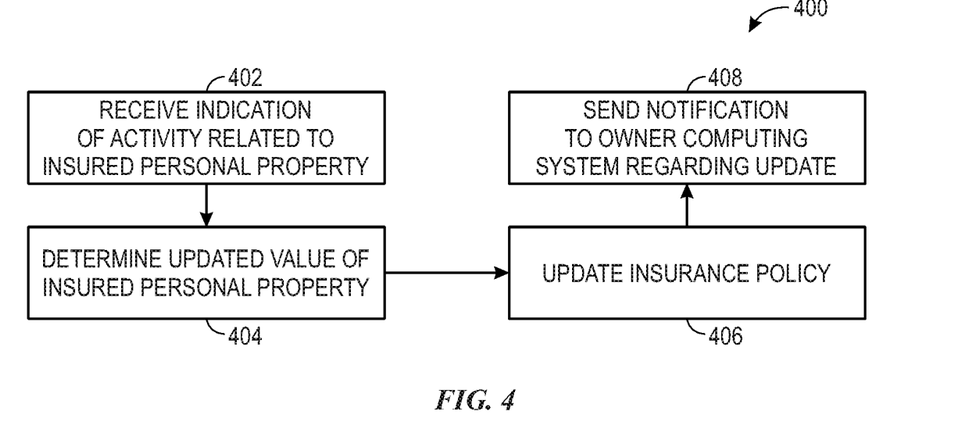
FIG. 4 illustrates a method for updating an insurance policy for an item of personal property using the distributed ledger (e.g., blockchain network), in accordance with embodiments described herein.

After an insurance policy has been generated for a personal property item, additional financial transactions may occur and updates may be necessary for the insurance policy. For example, if an owner of the personal property item chooses to sell the personal property item, then the insurance policy may be cancelled. In another example, an appraiser may determine an updated value of the personal property item which may require an update to terms of the insurance policy, such as a coverage amount. FIG. 4 illustrates a method 400 for updating an insurance policy for a personal property item using the distributed ledger 102 described herein. It should be noted that although method 400 is described below in a particular order, it should be understood that the method 400 may be performed in any suitable order. Additionally, although the method 400 is described as being performed by insurer computing system 118, any suitable computing device may perform the method 400.

As illustrated in FIG. 4, in certain embodiments, the method 400 may include the insurer computing system 118 receiving an indication of activity related to an insured personal property item stored on a distributed ledger (e.g., the distributed ledger 102) (block 402). For example, in some embodiments, the insurer computing system 118 may perform periodic checks of the information stored on the distributed ledger for updates to information corresponding to the insured personal property item. In another embodiment, the distributed ledger may automatically message the insurer computing system 118 when updates are made to information stored on the distributed ledger. For example, the distributed ledger may send a notification to the insurer computing system 118 containing the updated information. In some embodiments, the indication may be in the form of an email sent to the insurer, a short message service (SMS), or another suitable communication medium. In certain embodiments, receiving the indication may open an application on the insurer computing system 118 to display the indication. An indication may be received in response to a financial transaction (e.g., sale), appraisal of the personal property item, insurance claim on the personal property item, loss of the personal property item, damage to the personal property item, and the like. In certain embodiments, the indication may include a new owner of the personal property item.

After receiving the indication, the insurer computing system 118 may determine an updated value of the insured personal property item (block 404). For example, the insurer computing system 118 may analyze a recent appraisal and/or financial transaction for the personal property item that may be recorded on the distributed ledger. In certain embodiments, a user of the appraiser computing system 122 may store a set of property information 112 on the distributed ledger 102 associated with the personal property item and the appraisal. For example, the property information may include a manufacturer of the personal property item, a serial number of the personal property item, a model name of the personal property item, a determined value of the personal property item, an identification information for the appraiser of the personal property item, a date of appraisal for the personal property item, an identification information for an owner of the personal property item, and any other suitable appraisal information In some embodiments, an insurance claim and/or police report may indicate a partial or total loss of the personal property item. For example, a user of the client computing system 116 may store a set of images, video, police report(s), or any other suitable information on the distributed ledger 102. In certain embodiments, the insurer computing system 118 may perform object recognition on the images and/or the video to identify an object associated with the personal property item. For example, the insurer computing system 118 may identify the personal property item in the images and/or video and identify a damage or a covered loss of the personal property item.

In addition, in certain embodiments, the method 400 may include the insurer computing system 118 updating an insurance policy for the personal property item stored on the distributed ledger (block 406). For example, the insurer computing system 118 may update a premium amount, a coverage amount, and/or any additional policy terms based on the activity. The insurer computing system 118 may update a coverage amount based on the determined updated value stored on the distributed ledger 102 for the personal property item. For example, the insurer computing system 118 may update the coverage amount to equal the determined updated value from a recent appraisal. In certain embodiments, the insurer computing system 118 may update a premium amount based on the updated coverage amount. For example, the insurer computing system 118 may increase the premium amount based on an increase in the value of the personal property item or decrease the premium amount based on a decrease in the value of the personal property item. In certain embodiments, the insurer computing system 118 may cancel the insurance policy based on a partial or total loss of the personal property item. For example, the insurer computing system 118 may determine a partial or total loss of the personal property item occurred based on information stored on the distributed ledger 102. As a result of identified damage to the personal property item or loss of the personal property item, the insurer computing system 118 may determine the insurance policy is no longer required. The insurer computing system 118 may store cancellation information on the distributed ledger 102. The cancellation information may include a date of cancellation of the insurance policy, a reason for cancellation of the insurance policy, the personal property item previously covered by the cancelled insurance policy, evidence of damage to the personal property item, evidence of loss of the property item, or any other suitable cancellation information.

In addition, in certain embodiments, the method 400 may include sending a notification to the client computing system 116 regarding the update to the insurance policy (block 408). For example, the notification may be in the form of an email sent to the client computing system 116, a short message service (SMS), or another suitable communication medium. In certain embodiments, the notification may cause the client computing system 116 to open an application on the client computing system 116 to display the notification.

Figure 5:
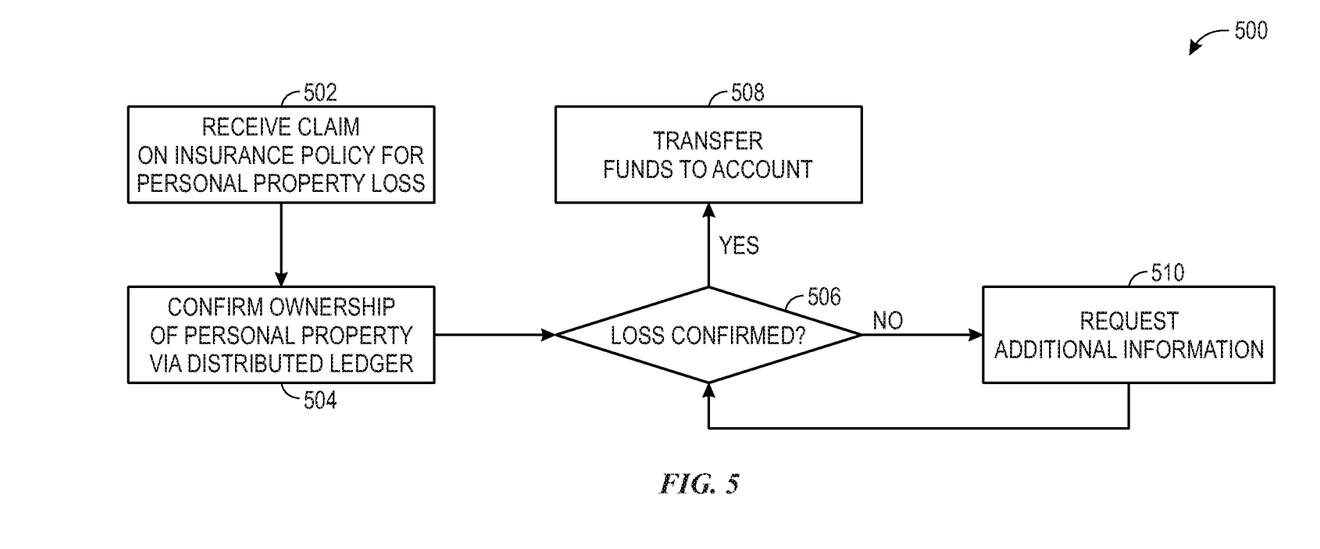
FIG. 5 illustrates a method for managing insurance claims for an item of personal property using the distributed ledger (e.g., blockchain network), in accordance with embodiments described herein.

After an insurance policy has been generated for a personal property item, a qualifying loss event covered by the insurance policy may occur resulting in damage or loss of the personal property item. When a qualifying loss event occurs, the owner of the insurance policy may request reimbursement for the qualifying loss by filing an insurance claim. Before issuing the reimbursement, organizations may confirm ownership of the personal property item and the occurrence of the qualifying loss in order to prevent fraud. FIG. 5 illustrates a method 500 for managing insurance claims for an item of personal property using the distributed ledger 102 described herein. It should be noted that although method 500 is described below in a particular order, it should be understood that the method 500 may be performed in any suitable order. Additionally, although the method 500 is described as being performed by insurer computing system 118, any suitable computing device may perform the method 500.

As illustrated in FIG. 5, in certain embodiments, the method 500 may include the insurer computing system 118 receiving an insurance claim for personal property loss on an insured personal property item (block 502). For example, the insurer computing system 118 may receive data related to an insurance claim from the client computing system 116. The data may include images of the personal property item, video of the personal property item, a police report associated with the personal property item, a description of damage to the personal property item, images of a qualifying loss, video of a qualifying loss, a date on which the qualifying loss occurred, a location at which the qualifying loss occurred, an identification (e.g., manufacturer, model name) of the personal property item, a serial number of the personal property item, an insurance policy associated with the personal property item, or any other suitable insurance claim information.

In addition, in certain embodiments, the method 500 may include confirming ownership of the personal property item via the distributed ledger (block 504). For example, confirming ownership in block 504 may be similar to determining ownership in block 304 of FIG. 3. For example, insurer computing system 118 may analyze a serial number of the personal property item, a financial transaction history of the personal property item, and an initial transaction of the personal property item, among other data stored in the distributed ledger. In certain embodiments, the insurer computing system 118 may compare initial transaction information stored in the distributed ledger 102 from a manufacturer of the personal property item to data provided in the insurance claim from the client computing system 116. For example, the insurer computing system 118 may analyze a transaction history to determine ownership of the personal property item. A series of financial transactions associated with the personal property item may be stored on the virtual ledger 102. The insurer computing system 118 may trace the ownership of the personal property item from the manufacturer to a current owner. For example, the insurer computing system 118 may determine an initial owner of the personal property item based on initial transaction information stored in the distributed ledger 102. The initial transaction information may include an identification of the manufacturer of the personal property item and an identification of an initial purchaser of the personal property item. The insurer computing system 118 may determine a subsequent purchase of the personal property item occurred and financial transaction information associated with the subsequent purchase is stored on the distributed ledger 102. For example, the financial transaction information may include the initial purchaser as the seller of the personal property item and identification information for a subsequent purchaser of the personal property item. The insurer computing system 118 may continue analyzing a transaction history of the personal property item until reaching a final chronological transaction associated with the personal property item. The insurer computing system 118 may compare the final purchaser identification information with owner identification information provided by the user of the client computing system 116. By comparing and matching the respective identification information, the insurer computing system 118 may validate an ownership of the personal property item. For example, the respective identification information may include a name, a physical address, an email address, a public key, a social security number, and any other suitable identification information.

In addition, in certain embodiments, the method 500 may include determining whether a partial loss or total loss of value of the personal property item (block 506) occurred. For example, the insurer computing system 118 may receive audiovisual information stored on the distributed ledger 102 (e.g., photo(s), video(s), etc.) depicting a current state of the personal property item, a police report corresponding to the personal property item, and the like. In certain embodiments, the insurer computing system 118 may perform object recognition on the audiovisual information to determine an amount of damage associated with the personal property item. For example, the insurer computing system 118 may determine a partial loss occurred to an item of jewelry due to a lost gemstone, a bent setting, or any other suitable loss.

In response to confirming the loss of the personal property item (YES path of block 506), the insurer computing system 118 may transfer funds to an account of the owner of the personal property item (block 508). For example, the insurer computing system 118 may receive information corresponding to a bank account for the owner of the personal property item in the insurance claim. The insurer computing system 118 may determine an appropriate amount of funds to transfer to the bank account based on the terms of the insurance policy and the confirmed loss. For example, the insurer computing system 118 may confirm a total loss of the personal property item and identify a coverage amount in the insurance policy. The insurer computing system 118 may transfer funds in an amount equal to the coverage amount to the bank account identified in the insurance claim. In certain embodiments, the insurer computing system 118 may send a notification to the client computing system 116 before and/or after the funds transfer. For example, the notification may be in the form of an email sent to the client computing system 116, a short message service (SMS), or another suitable communication medium. In certain embodiments, the notification may cause the client computing system 116 to open an application on the client computing system 116 to display the notification. In some embodiments, the notification may include an amount of the funds transfer, a reason for the funds transfer, and any other suitable information. In certain embodiments, the insurer computing system 118 may update the insurance policy stored on the distributed ledger 102 in response to the insurance claim and/or the confirmed loss. For example, the insurer computing system 118 may cancel the insurance policy in response to confirming a total loss of the item of personal property. In some embodiments, the insurer computing system 116 may send a notification to the client computing system 116 about the cancellation of the insurance policy. For example, the notification may be in the form of an email sent to the client computing system 116, a short message service (SMS), or another suitable communication medium. In certain embodiments, the notification may cause the client computing system 116 to open an application on the client computing system 116 to display the notification.

If the loss is not confirmed (NO path of block 506), the insurer computing system 118 may send a request to the client computing system 116 for additional information corresponding to the personal property item. For example, the insurer computing system 118 may request additional audiovisual information. In certain embodiments, receiving the request may cause the client computing system 116 to open an application on the client computing system 116. The additional information received by the insurer computing system 118 may assist in confirming the qualifying loss of the personal property item. For example, the additional information may include additional photos of a current state of the personal property item. The additional photos may include property information associated with the personal property item, such as a serial number of the personal property item, a manufacturer of the personal property item, a model name of the personal property item, a location of manufacturing of the personal property item, a date of manufacturing of the personal property item, and any other suitable property information.

While only certain features of the disclosure have been illustrated and described herein, many modifications and changes will occur to those skilled in the art. For example, while the embodiments described herein include a specific logic organization for data structures and libraries, substantially similar benefits provided by the present invention may be obtained by trivial structural alterations such as changes in name or in non-substantial changes to the mode of operation of the data structures. It is, thus, to be understood that the appended claims are intended to cover all such modifications and changes as fall within the true spirit of the invention.

The invention claimed is:

1. A system, comprising:
at least one processor; and
at least one non-transitory computer-readable media communicatively coupled to the at least one processor, the at least one non-transitory computer-readable media storing instructions which, when executed, cause the processor to perform operations comprising:
receiving a request to insure an item of personal property from a computing device associated with a user;
accessing a distributed ledger stored on at least one computing device, wherein the distributed ledger is associated with the item of personal property, and wherein the distributed ledger comprises:
merchant information indicative of identification information associated with a merchant;
personal information indicative of identification information associated with at least one previous owner of the item of personal property, a current owner of the item of personal property, or both; and
property information indicative of an appraisal value associated with the item of personal property;
determining that the item is currently owned by the user based on the personal information of the distributed ledger;
determining that the item is authentic based on the merchant information of the distributed ledger;
determining a value of the item based on the property information of the distributed ledger;
generating an insurance policy for the item based at least in part on the value in response to determining that the item is currently owned by the user and that the item is authentic; and
sending a notification indicative of the insurance policy to the computing device, wherein the notification is configured to cause the computing device to display a visualization indicative of one or more properties of the insurance policy.

2. The system of claim 1, wherein the instructions which, when executed, cause the processor to further perform the operations comprising:
receiving an indication of an activity related to the item of personal property; and
determining an updated value of the item of personal property.

3. The system of claim 2, wherein the instructions which, when executed, cause the processor to update the insurance policy for the item based at least on the updated value.

4. The system of claim 2, wherein the activity comprises an appraisal of the item, a financial transaction for the item, a loss of the item, or any combination thereof.

5. The system of claim 3, wherein the instructions which, when executed, cause the processor to further perform the operations comprising sending a notification corresponding to the activity to a computing system.

6. The system of claim 1, wherein the instructions which, when executed, cause the processor to further perform the operations comprising sending a notification of the insurance policy to a computing system.

7. The system of claim 1, wherein the instructions which, when executed, cause the processor to further perform the operations comprising storing the insurance policy for the item in the distributed ledger.

8. A method, comprising:
receiving, from a distributed ledger via a processor, an indication of an activity related to a personal property item having a first value, the personal property item associated with an insurance policy stored on the distributed ledger, the distributed ledger comprising:
merchant information indicative of identification information associated with a merchant;
personal information indicative of identification information associated with at least one previous owner of the item of personal property, a current owner of the item of personal property, or both; and property information indicative of an appraisal value associated with the item of personal property, the insurance policy, or both;

determining, via the processor, an updated value of the personal property item based on the activity;

updating, via the processor, at least one of one or more terms of the insurance policy based on the updated value; and sending a notification indicative of the updated at least one of the one or more terms of the insurance policy to a computing device, wherein the notification is configured to cause the computing device to display a visualization indicative of one or more properties of the insurance policy.

9. The method of claim 8, wherein the activity comprises one or more of an appraisal of the personal property item, a financial transaction for the personal property item, and a loss of the personal property item.

10. The method of claim 9, further comprising determining, via the processor, ownership of the personal property item based on transaction history information stored on the distributed ledger, wherein the transaction history information includes a series of financial transactions associated with the personal property item.

11. The method of claim 10, wherein the series of financial transactions comprises:

a first transaction information associated with the personal property item, the first transaction information including a manufacturer of the personal property item and an initial purchaser of the personal property item.

12. The method of claim 11, wherein the series of financial transactions comprises:

a second transaction information associated with the personal property item, the second transaction information including the initial purchaser of the personal property item and a subsequent purchaser of the personal property item.

13. The method of claim 9, wherein updating at least one of the one or more terms includes updating a coverage amount in the insurance policy based on the updated value.

14. The method of claim 13, wherein the coverage amount is equal to the updated value.

15. The method of claim 9, wherein updating at least one of the terms includes updating a premium amount in the insurance policy based on the updated value.

16. The method of claim 9, wherein updating at least one of the one or more terms includes cancelling the insurance policy.

* * * * *